United States Patent [19]

Reinhardt et al.

[11] 4,113,113

[45] Sep. 12, 1978

[54] VALVE CLOSURE FOR RAILWAY CAR CUSHIONING DEVICE

[75] Inventors: James R. Reinhardt; Mark P. Scott, both of Houston, Tex.

[73] Assignee: ACF Industries, Incorporated, New York, N.Y.

[21] Appl. No.: 833,947

[22] Filed: Sep. 16, 1977

[51] Int. Cl.² .............................................. B61G 9/02
[52] U.S. Cl. ..................................................... 213/43
[58] Field of Search ...................... 213/8, 43, 46, 223; 293/71 P, 71 R; 188/282, 284, 285, 317; 267/65 R

[56] References Cited

U.S. PATENT DOCUMENTS

| | | | |
|---|---|---|---|
| 1,445,615 | 2/1923 | Ferres | 188/284 |
| 3,596,773 | 8/1971 | Peterson | 188/282 |
| 3,826,343 | 7/1974 | Heymann | 188/282 |
| 4,040,523 | 8/1977 | Carle et al. | 213/46 R |

Primary Examiner—Trygve M. Blix
Assistant Examiner—Jesus D. Sotelo
Attorney, Agent, or Firm—Eugene N. Riddle

[57] ABSTRACT

An end-of-car railway car cushioning unit has a cylinder and a cylindrical piston mounted in the cylinder with the piston rod secured to the piston extending through an opening in the rear end of the cylinder with the piston forming a high pressure fluid chamber on the front face thereof and a low pressure fluid chamber on the rear face thereof. The piston has a plurality of openings therethrough and a metering valve is mounted in each of the openings to meter fluid flow between the low pressure chamber and the high pressure chamber. Each metering valve has a buff flow passage and a restricted draft flow passage. At least one selected metering valve has a cylindrical extension thereon projecting from the front face of the piston and adapted to engage an end wall of the high pressure chamber as the piston approaches the end of its buff stroke to block the flow of fluid from the high pressure chamber to the associated metering valve adjacent the end of the buff stroke. The extension is mounted for a limited inward movement upon contact with the end wall forming the cylinder to permit movement of the piston after such contact. The metering valves having the closure extension thereon are set to open at a lower force level than the remaining metering valves and a high force level is thus required for additional buff travel after the closure extension contacts the cylinder end wall.

9 Claims, 8 Drawing Figures

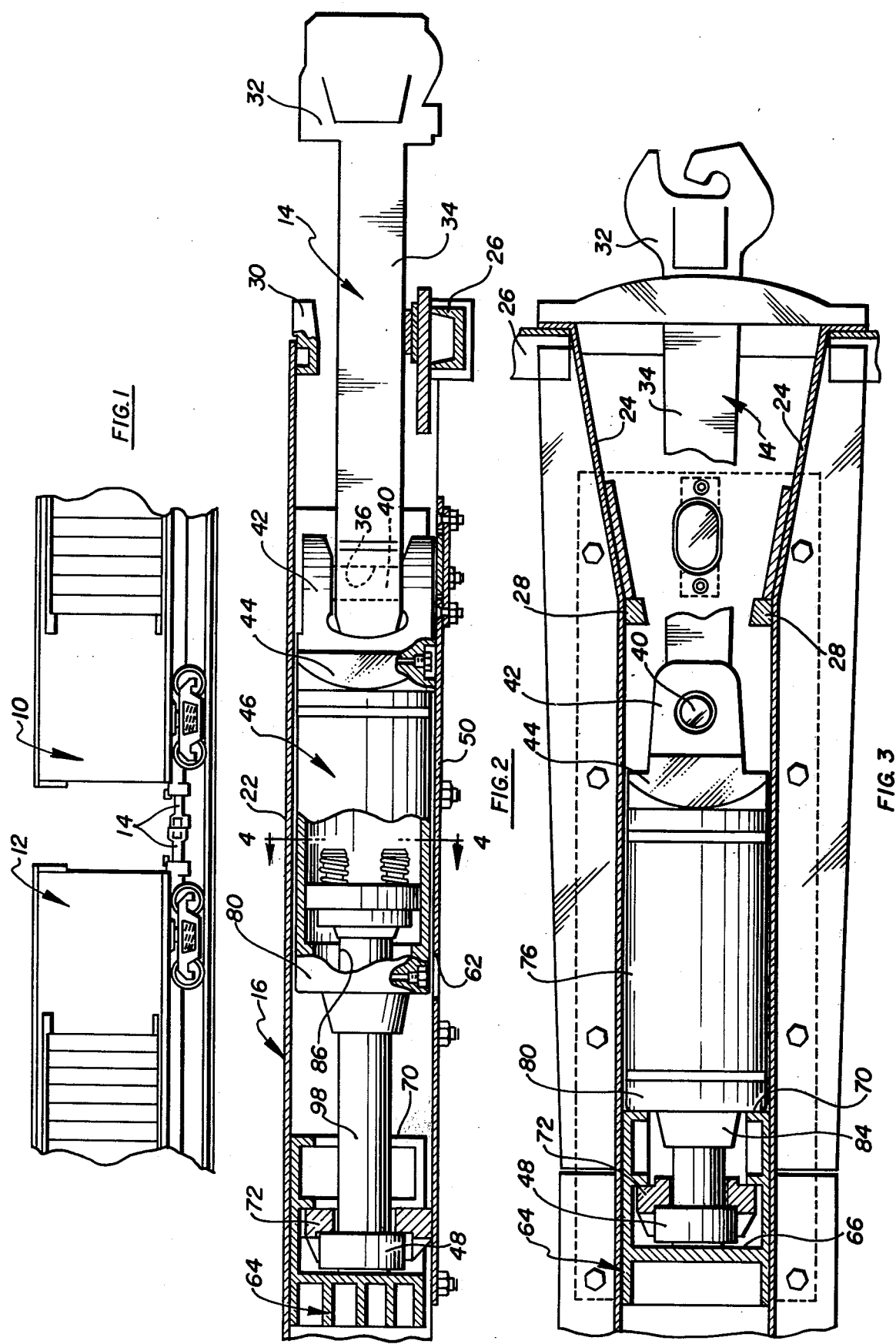

VALVE CLOSURE FOR RAILWAY CAR CUSHIONING DEVICE

BACKGROUND OF THE INVENTION

It is desirable for end-of-car cushioning devices under certain operating and train handling conditions to have a so-called reserve capacity adjacent the end of the buff travel particularly if the cushioning device is restricted at a relatively low force level which is desirable for cushioning of relatively low forces. Some prior art cushioning devices have a restricted flow adjacent the end of the buff travel which is obtained by a restricted metering orifice.

U.S. Pat. No. 4,040,523 dated Aug. 9, 1977 and entitled "Railway Car Cushioning Device" discloses an end-of-car cushioning device having a piston separating a cylinder into a high pressure chamber and a low pressure chamber with openings through the piston receiving a metering valve in each of the openings. The metering valves are set to open at a predetermined force level and are set to close at a predetermined force level. All of the metering valves are set to open and close at the same force level and this arrangement has been found to operate effectively with the high pressure and low pressure chambers having a mixture of gaseous and liquid fluid therein under a preload fluid pressure.

DESCRIPTION OF THE PRESENT INVENTION

The present invention is an improvement in the end-of-car cushioning device shown in the above mentioned U.S. Pat. No. 4,040,523 and includes a plurality of metering valves with some of the metering valves being opened at force levels higher than the remaining metering valves. The low level force metering valves are closed adjacent the end of the buff travel stroke to block the flow of fluid through the associated metering valves. Each low level force metering valve has a cylindrical extension adapted for movement between extended and retracted positions and engaging the end wall of the cylinder when the unit approaches the end of its buff travel stroke. Upon engagement of the extension with the end wall of the cylinder, the flow of fluid is blocked through the associated metering valve and the extension is moved by contact with the end wall of the cylinder to a retracted position. The metering valves associated with the valve closure are set to open at a lower pressure than the metering valves not having a valve closure thereon. For example, with an end-of-car cushioning device having a total 10 inch travel, four metering valves may be mounted in the piston to control the flow of fluid between the high pressure and low pressure chambers. Two of the valves have the valve closure extension thereon and are set to open and close at around a 225,000 lb. force with the remaining metering valves set to open at a 400,000 lb. force. Thus, when the cushioning unit reaches around 9 inches of buff travel from impact forces the valve closure members will become effective to close off the flow of fluid through the associated low force level metering valves and the piston will only move to the end of its stroke at 10 inches when the pressure in the high pressure chamber is above the 400,000 lb. level. This arrangement would also minimize any bottoming out of the cushioning device through train action normally encountered. In addition, since a restricted flow area is provided during the last inch of buff travel, additional energy is dissipated hydraulically during this travel which provides a "reserve" capacity.

BRIEF DESCRIPTION OF THE DRAWINGS

FIG. 1 is a side elevation view of a pair of railway cars coupled to each other;

FIG. 2 is a longitudinal sectional view, certain parts broken away, of a hydraulic-pneumatic cushioning device having the present invention positioned in the center sill of a railway car and connected to a coupler for cushioning impact forces exerted against the coupler;

FIG. 3 is a plan view showing the cushioning device of FIG. 2 in a compressed position after impact forces have been exerted against the coupler;

DETAILED DESCRIPTION OF THE INVENTION

Figure 6:
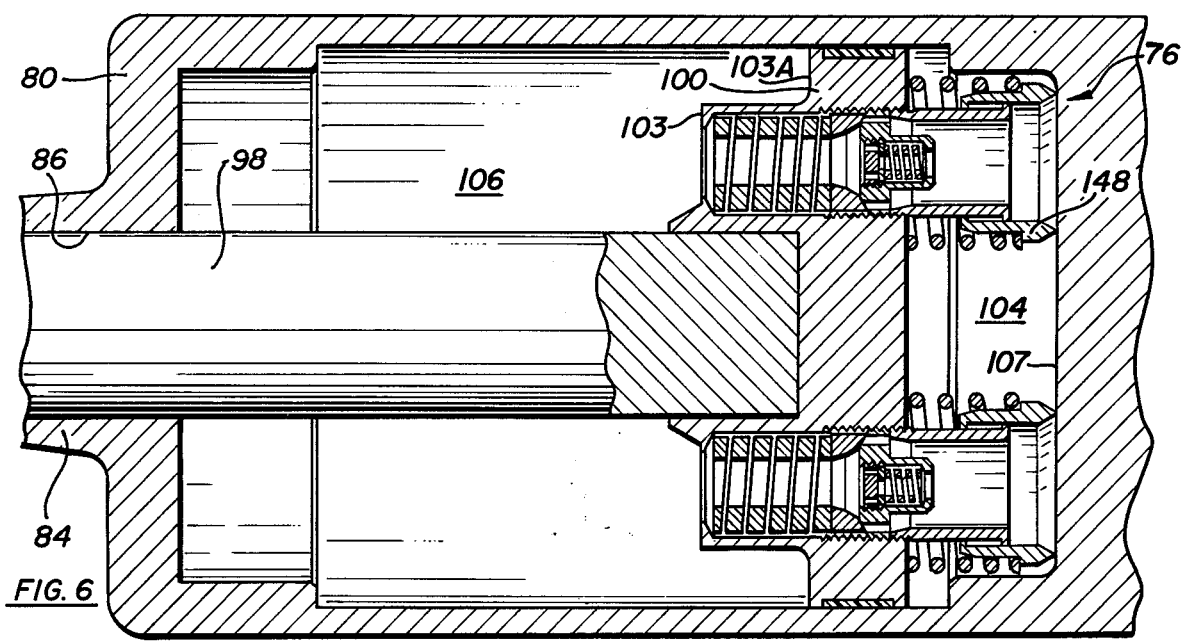
FIGS. 5 and 6 are enlarged sectional views showing the low force level metering valves forming the present invention mounted in the piston, FIG. 5 showing the arrangement prior to contact with the rear wall of the cylinder and FIG. 6 showing the metering valve after the valve extension has contacted the rear wall of the cylinder and has been moved to a retracted position to block the flow of fluid through the metering valve.
Figure 5:
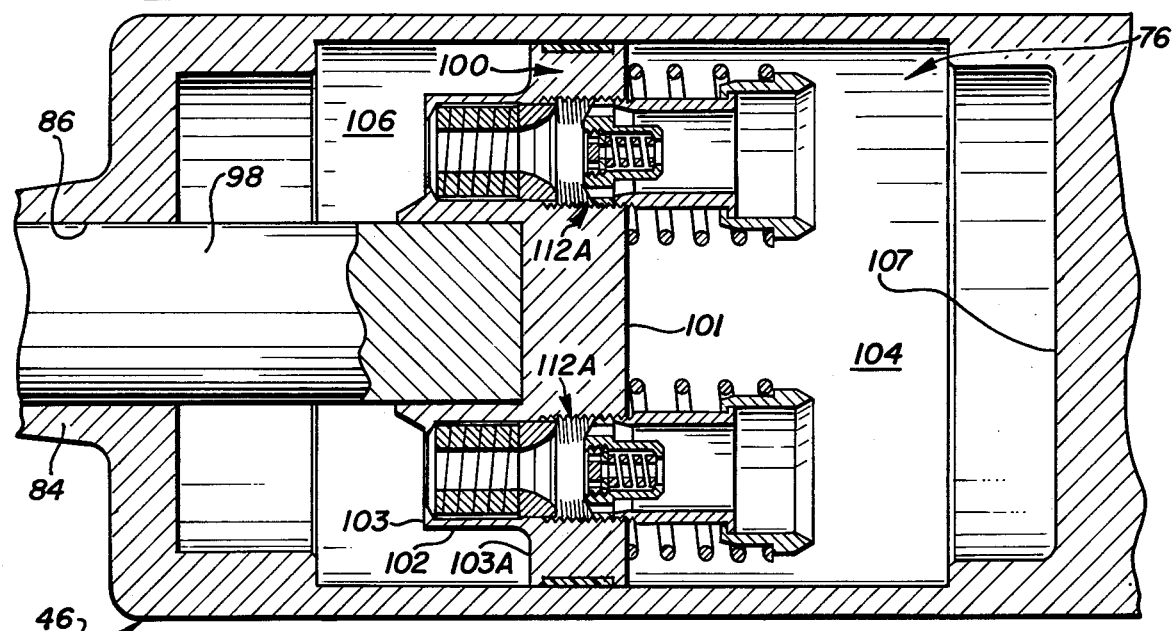
Figure 4:
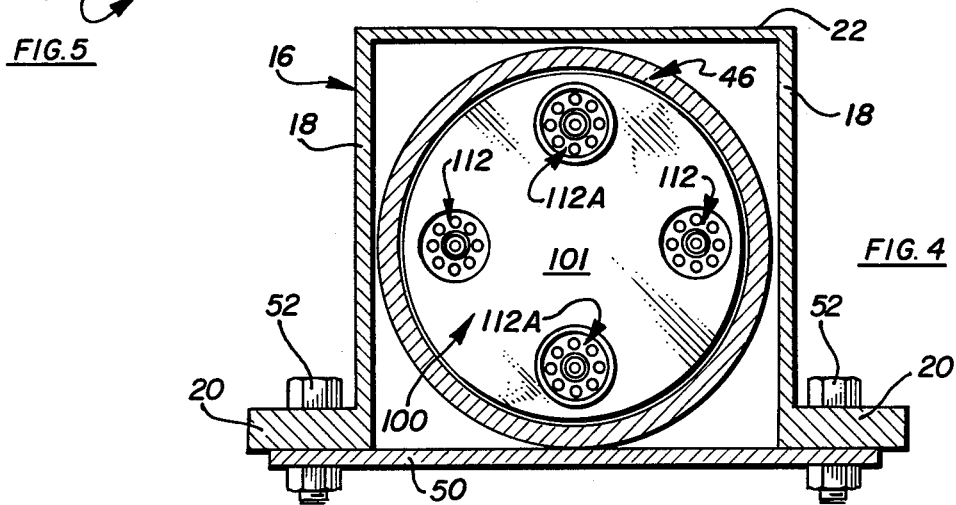
FIG. 4 is a section taken generally along line 4—4 of FIG. 2.

Referring now to the drawings for a better understanding of the invention, railway box cars generally indicated at 10 and 12 are inner-connected to each other by couplers 14. A center sill shown at 16 includes spaced sides or webs 18 having lower outwardly extending flanges 20. A top cover plate 22 extends between sides 18 to form a generally hat-shaped center sill 16. The outer end of center sill 16 has outwardly flared side portions 24 and a lower coupler carrier 26 extends between flared side portions 24. Front draft lugs 28 are secured to inner surfaces of sides 18 at the juncture of sides 18 with outwardly flared side portions 24. A striker 30 extends between the upper ends of side portions 24.

Coupler 14 includes a coupler head 32 and a coupler shank 34 having a vertical opening 36 therein adapted to receive a pivot pin 40. Coupler 14 is an F-type coupler as designated by the AAR (Association of American Railroads) and is particularly adapted for long length flat cars. It is to be understood that the present invention could be employed with E-type couplers, if desired.

A bifurcated end connection 42 is connected to shank 34 about pivot pin 40 and is formed integrally with an end cap 44 of a hydraulic-pneumatic cushioning unit generally designated at 46. End connection 42 and end cap 44 form one end of hydraulic-pneumatic cushioning unit 46 and the other end is formed by an end collar 48. Mounting cushioning unit 46 within center sill 16 is a lower cover plate 50 which may be removably connected by bolts 52 to flanges 20 of center sill 16. Cover plate 50 has an opening 62 to provide access to cushioning unit 46 for inserting fluids within cushioning unit 46 as will be explained further. A backstop casting generally indicated at 64 is welded to sides 18 of center sill 16. Backstop casting 64 provides an abutting face 66 which is in abutting contact with end collar 48 of cushioning unit 46 to receive buff loads. Forming a part of backstop casting 64 are buff limiting stops 70 which contact cushioning unit 46 at the full buff position as shown in FIG. 3 after around 10 inches of travel, for example. A removable adapter 72 is positioned between collar 48 and backstop casting 64 to permit a standard backstop casting to be employed with collar 48. Draft loads are transferred from collar 48 to adapter 72, thence to backstop casting 64 to center sill 16. Buff loads are transferred directly by backstop casting 64 to center sill 16.

Figure 7:
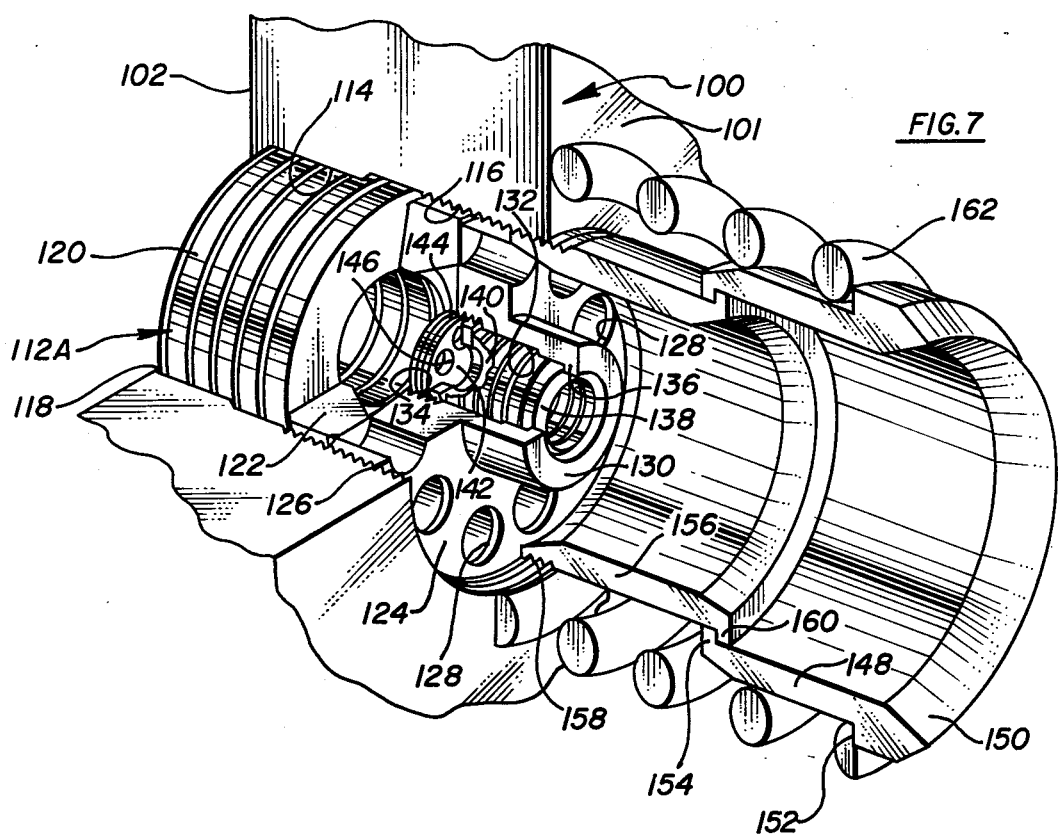
FIG. 7 is an enlarged perspective view, partly in section, showing the low force level metering valve forming the present invention.
Figure 8:
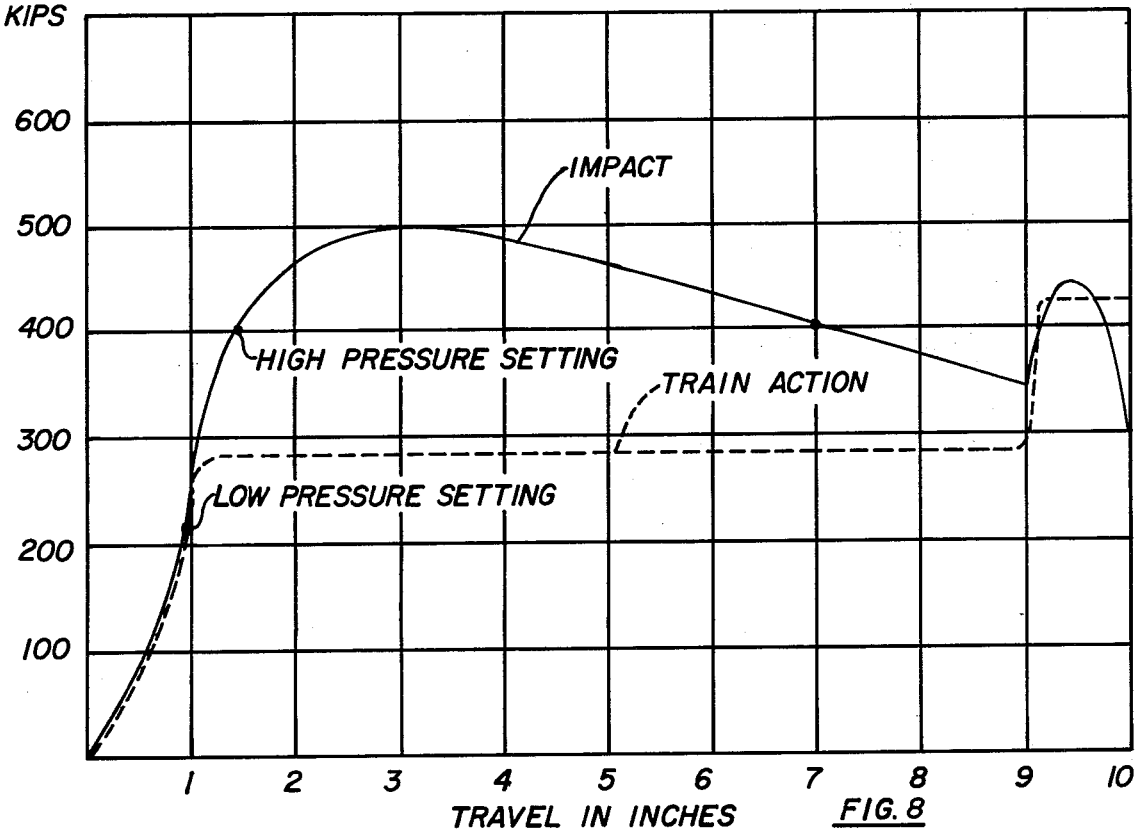
FIG. 8 is a graph showing force-travel curves for the cushioning unit shown in FIGS. 1-6 after an impact load and during train action to illustrate the functioning of the valve closure member at around 9 inches of buff travel.

Hydraulic-pneumatic cushioning unit 46 includes a cylinder 76 which is welded to front end cap 44 as shown in FIG. 7. A rear end cap 80 is welded to cylinder 76 and has an outwardly extending tubular sleeve 84 with a central opening 86 therethrough. A piston rod 98 has end collar 48 on its rear end and is mounted for reciprocating movement relative to cylinder 76. A piston 100 is secured to the front end of piston rod 98 and has a front face 101. Piston 100 includes a reduced diameter portion 102 and a rear face formed by rear face portions 103 and 103A. Piston 100 divides the volume of cylinder 76 into a high pressure chamber 104 and a low pressure chamber 106. High pressure chamber 104 is defined in part by end wall 107 of cylinder 76.

Mounted in and carried by piston 100 are a plurality of metering valves 112 and 112A mounted in openings 114 extending through piston 100. Metering valves 112 and 112A are generally identical except that valves 112 are low force level valves set to open at around a 225,000 lb. force, for example, and valves 112A are high force level valves set to open in buff travel at around a 400,000 lb. force, for example. Metering valves 112A also are each provided with a valve closure, as will be explained hereinafter, which blocks the flow and metering of fluid from high pressure chamber 104 through the associated metering valves 112A adjacent the end of the buff travel stroke such as for example after 9 inches of travel for a 10 inch travel unit and after 13½ inches travel for a 15 inch travel unit.

For the purposes of illustration, only one metering valve is described in detail, it being understood that the remaining metering valves are generally identical. Valve 112A is shown within opening 114 extending through piston 100. Internal screw threads 116 are provided adjacent one end of opening 114 and an annular flange 118 extends about the other opposite end of opening 112. Mounted within opening 114 is a coil buff spring 120 fitting against flange 118 and having a center opening therethrough. A buff adapter 122 is mounted adjacent spring 120 and engages the adjacent face of spring 120 to compress spring 120 upon the exertion of buff loads. A buff orifice ring member or plate 124 has external screw threads 126 thereon engaged in threaded relation to internal screw threads 116. A plurality of buff orifices or openings 128 are provided in a circle about ring member 124. Ring member 124 has a generally cylindrical extension 130 on its front face, and a central opening 132 therethrough has internal screw threads 134 adjacent its inner end. An outer annular flange 136 is provided adjacent the outer end of extension 130. Mounted within central opening 132 is a coiled draft spring 138 which abuts flange 136. An annular draft adapter 140 is positioned adjacent spring 138 and a relatively flat draft orifice plate 142 is provided with external screw threads 144 engaging in threaded relation internal screw threads 134. Orifice plate 142 has a plurality of draft orifices or openings 146 arranged in a circle about orifice plate 142. In a neutral position, draft spring 138 urges annular adapter 140 against draft orifice plate 142 to cover openings 146 and thereby prevent the flow of fluid therethrough. Likewise, buff spring 120 in neutral position urges adapter 122 against openings 128 to prevent the flow of fluid therethrough. Buff spring 120 for metering valves 112 has a different spring rate from buff spring 120 for metering valves 112A as valves 112A are set to open at a low force level. For further details concerning the functioning of cushioning unit 46, reference is made to the aforementioned U.S. Pat. No. 4,040,523, the entire disclosure of which is incorporated by this reference.

Forming an important part of this invention is the valve closure for metering valves 112A shown particularly in FIGS. 4-7. The valve closure comprises an extension 148 having an extending tapered end 150 and an outer flange 152 which forms a spring retaining seat. An inner flange 154 is provided adjacent the inner end of extension 148. Extension 148 fits about a fixed sleeve 156 having external screw threads 158 adjacent its inner end which are in threaded engagement with internal screw threads defined at 116. The outer end of sleeve 156 has an outer retaining flange 160 which engages flange 154 and limits the movement of extension 148. A coil spring 162 is seated against front face 101 of piston 100 adjacent one end and is biased adjacent the other end against flange 152 to continuously urge extension 148 outwardly. Flanges 154 and 160 abut each other under the bias of spring 162. Spring 120 for valve 112A is of a lower spring rate than spring 120 for valve 112. For example, the spring rate of spring 120 for valve 112 is such that buff plate 122 is unseated at around a 400,000 lb. force while spring 120 for valve 112A is set to permit unseating of plate 122 when a 225,000 lb. force level is reached. Thus, with impact loads obtained at a velocity of around 10 miles per hour all four metering valves 112 and 112A are utilized during the travel of piston 100 when the force level is above 400,000 lbs. However, if the force level is below 400,000 lbs. only metering valves 112A are opened and the remaining metering valves 112 remain closed.

When the piston 100 reaches or approaches the end of its buff travel, such as around 9 inches of travel for a 10 inch unit or around 13½ inches for a 15 inch travel unit, the end 150 of extension 148 engages end wall 107 of cylinder 76 and this blocks the flow of fluid through the associated metering valves 112A thereby leaving only metering valves 112 for further cushioning upon additional buff travel of around 1 or 2 inches.

For illustration, cushioning unit 46 is shown as a 10 inch travel unit and end 150 of extension 148 engages end wall 107 after 9 inches of travel. This leaves an additional inch of travel during which only metering valves 112 are employed which open at a 400,000 lb. force level. A reserve capacity is thus provided by the blocking of flow through the low force level metering valves and permitting flow only when a high force level is reached through the remainder of the metering valves which are not blocked by the present invention.

Referring to FIG. 7, a typical force-travel curve for around a 10 mile an hour impact is indicated in solid lines for a cushioning unit having a total travel of 10 inches. The valve closure is effective upon 9 inches of travel. It is noted from this curve that the high force level valves open at around 1½ inches of travel and close thereby to reduce the amount of fluid metered.

7. A fluid cushioning unit as set forth in claim 6 wherein said means to restrict the flow of fluid comprises an open-ended generally cylindrical extension on said metering valve projecting from the front face of the piston into the high pressure chamber; and means mounting said extension for movement between extended and retracted positions and urging continuously said extension toward an extended position, said extension when said piston approaches the end of its buff travel engaging an adjacent end wall of the cylinder to block in cooperation with the end wall the flow of fluid through the associated metering valve from the high pressure chamber for the remainder of the buff travel, said extension returning to its extended position during the return of the piston to neutral position.

8. A fluid cushioning unit as set forth in claim 7 wherein said means mounting the extension for movement comprises a fixed sleeve extending from the front face of the piston fitting within the extension in a telescoping relation, and a coil spring around the sleeve biased between the front face of the piston and the extension to urge continuously the extension outwardly to extended position.

9. A fluid cushioning unit as set forth in claim 6 wherein an orifice plate is positioned adjacent said buff member and said draft member, said orifice plate having the relatively large buff flow passage therein exposing the buff member to fluid pressure from the high pressure chamber and the restricted draft flow passage therein exposing the draft member to fluid pressure from the low pressure chamber.

* * * * * at around 7 inches of travel as the force level drops below 400,000 lbs. The high force level metering valves are set to open at a 400,000 lb. force level and remain open as long as the force level remains over 400,000 lbs. If the force level in high pressure chamber 104 drops below 400,000 lbs. then valves 112 will close but will open again during the last inch of travel when the force level again reaches 400,000 lbs. The flow of fluid from high pressure chamber 104 through valves 112A is blocked at 9 inches of travel and valves 112A are ineffective for the remainder of buff travel after 9 inches. If the force level after 9 inches of buff travel is below 400,000 lbs. then the force level must exceed 400,000 lbs. for the last inch of travel. Thus an increased amount of energy is dissipated during the last inch of buff travel.

Also shown in FIG. 7 in broken lines is a typical force-travel curve resulting from train action for a 10 inch travel cushioning unit. The effect of the blocking of fluid flow from high pressure chamber 104 through valves 112 is shown by this curve. It is to be understood that the present invention may be utilized for cushioning units of different travel lengths and may block flow from the high pressure chamber at varying distances from the end of piston stroke as desired. This may be accomplished by altering the force levels at which valves 112 and 112A open and close, as desired.

What is claimed is:

1. A railway car having a center sill with an open outer end, a coupler mounted for movement within the center sill, a fluid cushioning unit mounted within the center sill and having a cylinder with front and rear end portions, said front end portion being connected to the coupler for receiving impact forces from the coupler;
   a generally cylindrical piston mounted within the cylinder for longitudinal movement, a piston rod secured to the piston and extending through an opening in the rear end portion of the cylinder, said cylinder forming a high pressure fluid chamber adjacent the front face of the piston and a low pressure fluid chamber adjacent the rear face of the piston, said piston having a plurality of openings therethrough;
   a metering valve mounted in each of said openings to meter fluid flow between the low pressure chamber and the high pressure chamber, each of said metering valves having a relatively large buff flow passage and a restricted draft flow passage, said buff and draft flow passages being closed in the neutral extended position of the cushioning unit, said buff flow passage opening upon the reaching of a predetermined high fluid pressure in the high pressure chamber after the exertion of impact forces to meter the flow of the mixed gaseous and liquid fluids from the high pressure chamber to the low pressure chamber, said restricted draft flow passage opening upon the reaching of a predetermined high fluid pressure in the low pressure chamber upon a return travel of the unit to meter the flow of mixed gaseous and liquid fluid from the low pressure chamber to a high pressure chamber; and
   means on at least one of said metering valves to block the flow of fluid through the associated metering valve adjacent the end of the buff travel to reduce the fluid being metered through the metering valve and permitting the flow of fluid at all other times.

2. A railway car as set forth in claim 1 wherein said means to block the flow of fluid comprises an open-ended generally cylindrical extension on said metering valve projecting from the front face of the piston into the high pressure chamber; and
   means mounting said extension for movement between extended and retracted positions and urging continuously said extension toward an extended position, said extension when said piston approaches the end of its buff travel engaging an adjacent end wall of the cylinder to block in cooperation with the end wall the flow of fluid through the associated metering valve from the high pressure chamber for the remainder of the buff travel, said extension returning to its extended position during the return of the piston to neutral position.

3. A railway car as set forth in claim 2 wherein:
   said means mounting the extension for movement comprises a fixed sleeve extending from the front face of the piston fitting within the extension in a telescoping relation, and a coil spring around the sleeve biased between the front face of the piston and the extension to urge continuously the extension outwardly to extended position.

4. A railway car as set forth in claim 1 including a buff cover member for the buff flow passage, a buff spring urging the cover member toward the high pressure chamber and a closed position of the buff flow passage, a draft cover member for the draft flow passage, and a draft spring urging the draft cover member toward the low pressure chamber and a closed position of the draft flow passage.

5. A cushioning unit as set forth in claim 4 wherein an orifice plate is positioned adjacent said buff member and said draft member, said orifice plate having the relatively large buff flow passage therein exposing the buff member to fluid pressure from the high pressure chamber and the restricted draft flow passage therein exposing the draft member to fluid pressure from the low pressure chamber.

6. A fluid cushioning unit for railway cars comprising:
   a cylinder having front and rear end portions, a piston mounted with the cylinder for reciprocal movement, a piston rod secured centrally to a face of the piston and extending through an opening in the rear end portion of the cylinder, said cylinder forming a high pressure chamber adjacent the front face of the piston and a low pressure chamber adjacent the rear face of the piston in which the piston rod is mounted, said piston having a plurality of openings therethrough between the low pressure and high pressure chambers; and
   a metering valve mounted in each of said openings to control fluid flow between the low pressure chamber and the high pressure chamber and having a relatively large buff flow passage and a restricted draft flow passage, said metering valve comprising a movable buff member covering the buff flow passage and exposed to fluid pressure in the high pressure chamber, a buff spring urging the buff member toward a closed position of the buff flow passage, a movable draft member covering the draft flow passage and exposed to fluid pressure in the low pressure chamber, a draft spring urging the draft member toward a closed position of the draft flow passage, said draft spring and said buff spring being coiled springs arranged in concentric relation to each other, and means on at least one metering valve to restrict the flow of fluid through the buff flow passage adjacent the end of the buff travel